(12) United States Patent
Mister

(10) Patent No.: US 8,769,433 B2
(45) Date of Patent: Jul. 1, 2014

(54) METHOD AND APPARATUS FOR PROTECTING COMMUNICATION OF INFORMATION THROUGH A GRAPHICAL USER INTERFACE

(75) Inventor: Serge Jean Maurice Mister, Ottawa (CA)

(73) Assignee: Entrust, Inc., Dallas, TX (US)

( * ) Notice: Subject to any disclaimer, the term of this patent is extended or adjusted under 35 U.S.C. 154(b) by 511 days.

(21) Appl. No.: 10/908,494

(22) Filed: May 13, 2005

(65) Prior Publication Data
US 2006/0259873 A1 Nov. 16, 2006

(51) Int. Cl.
*G06F 3/048* (2013.01)
(52) U.S. Cl.
USPC .......................................... 715/791; 715/764
(58) Field of Classification Search
USPC ......... 715/764, 766, 781, 788, 790, 791, 794, 715/796, 803; 713/168
See application file for complete search history.

(56) References Cited

U.S. PATENT DOCUMENTS

| | | | | |
|---|---|---|---|---|
| 5,046,001 | A * | 9/1991 | Barker et al. | 715/794 |
| 5,550,968 | A * | 8/1996 | Miller et al. | 715/741 |
| 6,031,530 | A * | 2/2000 | Trueblood | 715/791 |
| 6,445,400 | B1 * | 9/2002 | Maddalozzo et al. | 715/803 |
| 6,874,126 | B1 * | 3/2005 | Lapidous | 715/711 |
| 7,114,177 | B2 * | 9/2006 | Rosenberg et al. | 726/4 |
| 7,162,739 | B2 | 1/2007 | Cowden et al. | |
| 7,509,490 | B1 * | 3/2009 | Hsu et al. | 713/162 |
| 8,028,245 | B2 * | 9/2011 | Yolleck et al. | 715/777 |
| 2002/0080184 | A1 | 6/2002 | Wishoff | |
| 2004/0125149 | A1 * | 7/2004 | Lapidous | 345/808 |
| 2004/0230820 | A1 * | 11/2004 | Hui Hsu et al. | 713/200 |
| 2005/0091486 | A1 * | 4/2005 | Avraham et al. | 713/162 |
| 2005/0120242 | A1 * | 6/2005 | Mayer et al. | 713/201 |
| 2006/0021031 | A1 * | 1/2006 | Leahy et al. | 726/22 |
| 2006/0070008 | A1 * | 3/2006 | Sauve et al. | 715/788 |
| 2006/0080619 | A1 * | 4/2006 | Carlson et al. | 715/781 |
| 2008/0172382 | A1 * | 7/2008 | Prettejohn | 707/6 |

OTHER PUBLICATIONS

Ye, Eileen Zishuang, et al.; Web Spoofing Revisited: SSL and Beyond; Department of Computer Science, Dartmouth College; Feb. 1, 2002; pp. 1-15.
Ye, Eileen Zishuang, et al.; Trusted Paths for Browsers: An Open-Source Solution to Web Spoofing; Department of Computer Science, Dartmouth College; Feb. 4, 2005; pp. 1-11.
SSL's Credibility as Phishing Defense Is Tested; from www.netcraft.com; Apr. 22, 2004.
Dhamija, Rachna, et al.; The Battle Against Phishing: Dynamic Security Skins; May 2005.

* cited by examiner

*Primary Examiner* — Rashawn Tillery
(74) *Attorney, Agent, or Firm* — Faegre Baker Daniels LLP

(57) ABSTRACT

A method and apparatus for protecting communication of information through a graphical user interface displays a graphical user interface that includes a trusted interaction window. In one example, the method includes continuously determining whether information has been overlayed on top of at least a portion of the displayed trusted interaction window and then disabling an operation being requested when an overlay condition has been determined. In one example, the trusted interaction window is maintained to be the top most window when it is called by an application, for example, during an online transaction, or any other suitable action. The trusted interaction window may be generated via a browser, or operating system, or any other suitable application. As such, the trusted interaction window detects when another window is overlayed on top of it, such as a chromeless window, thereby preventing an unscrupulous party from tricking the user or obtaining sensitive information.

13 Claims, 6 Drawing Sheets

METHOD AND APPARATUS FOR PROTECTING COMMUNICATION OF INFORMATION THROUGH A GRAPHICAL USER INTERFACE

FIELD OF THE INVENTION

The invention relates generally to methods and apparatus that employ graphical user interfaces, and more particularly to apparatus and methods that employ techniques for securing information during online transactions.

BACKGROUND OF THE INVENTION

Mobile and non-mobile devices are known that employ software applications that may interface with one or more operating systems and that invoke security code in a way that may be controlled by security policy data so that certain applications may have certain access to various operations of the system, including, but not limited to, other software applications, processes, hardware devices, subsystems or any other suitable process. Some applications are trusted applications in that they may be digitally signed by a trusted authority or source or may be trusted via some other trust relationship.

With the increase in online transactions and interactions, it is increasingly important to provide protections for a user that employs varying applications being run on the device. Trusted applications may be those, for example, that are downloaded over the web that the user has designated as trusted and other executables that may be launched that are trusted. An untrusted application may be one, for example, that has limited access to the operating system of the device or other applications because it is unsigned and is downloaded over the web, such as Java applets, javascript, or any other components.

Network attackers can employ graphical spoofing techniques wherein the display on the device may present a user with a graphical display (e.g. windows) that appears to be authentic, but is in fact a spoof interface thereby tricking the user into entering sensitive data such as bank account information or any other sensitive information. In some cases the spoofing application may redirect a user to another website and the browser on the user's device may not know that it is an improper site. Although browsers effectively own the frames or windows that are being displayed, web servers typically send information to the browser that controls filling the window and as such spoofing applications attempt to emulate the browser interfaces. For example, graphical user interface (GUI) buttons may appear to look proper but when the user selects them the buttons perform an unexpected function.

In one prior-art technique that attempts to defeat a spoofing application, the web browser uses two different window colours to distinguish trusted browser windows from those containing server-provided content. However, this does not protect against a rogue application creating a graphical representation of a window with a border of the trusted colour. A refinement of the idea also known in the art is for the browser to create a trusted reference window in addition to those it would normally display. The browser then changes the border colour used for all trusted windows at random intervals. The user can then recognize trusted windows by the fact that their borders change in sync with those of the trusted reference window. However, this technique does not defend against chromeless window attacks. Chromeless windows have no window borders, only the inside content of the window is shown. For example, a rogue application may overlay a chromeless window overtop of the contents of a trusted window with a randomly changing border. Because the border will still flash as expected, the user will be tricked into believing that the chromeless window content is displayed inside the trusted window.

In windows based operating systems that employ window graphical user interfaces, it is also known for the operating system to be able to determine the order in which windows overlap (sometimes referred to as the Z order). However such operating systems do not always notify a window that it has become a background window or if an active or topmost window has been covered. For example, the O.S. may send a message to an application when a previously hidden part of a window becomes visible, but not when previously visible parts of the window become hidden. Also, an operating system can notify a graphical application when it is uncovered because some or all of the newly exposed application window may need to be repainted.

Accordingly, a need exists for overcoming one or more of the above drawbacks.

DETAILED DESCRIPTION OF THE DRAWINGS

The invention will be more readily understood in view of the following description when accompanied by the below figures and wherein like reference numerals represent like elements:

DETAILED DESCRIPTION OF A PREFERRED EMBODIMENT OF THE INVENTION

Figure 1:
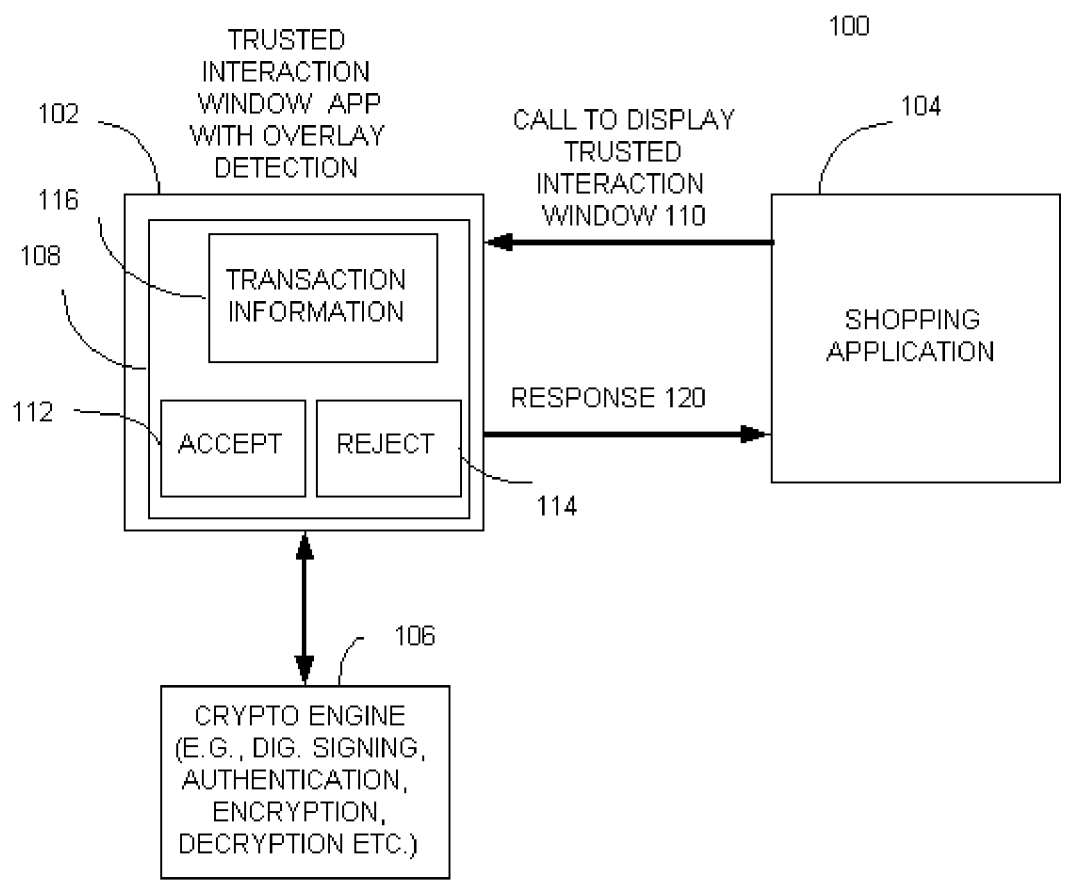
FIG. 1 is a block diagram illustrating one example of an apparatus employing a trusted interaction window in accordance with one embodiment of the invention.

Briefly, a method and apparatus for protecting communication of information through a graphical user interface displays a graphical user interface that includes a trusted interaction window. In one example, the method includes continuously determining whether information has been overlayed on top of at least a portion of the displayed trusted interaction window and then taking desired action when an overlay condition has been determined. Taking desired action may include, for example, disabling an operation being requested when an overlay condition has been determined or other desired action. In one example, the trusted interaction window is maintained to be the top most window when it is called by an application, for example, during an online transaction, or any other suitable action. The trusted interaction window may be generated via a browser, or operating system, or any other suitable application. As such, detection of interference with the trusted interaction window, such as a chromeless window, is used to determine if an unscrupulous party is interfering with an on-line transaction for example. The system detects, for example, when a chromeless window or any other data or window is overlaying the trusted interaction window thereby preventing an unscrupulous party from tricking the user or obtaining sensitive information. A user may be notified via visual or audible notification that the trusted interaction window has been overlayed so that the user may take the appropriate action if desired.

As such, a trusted interaction window is used as a trusted user application component designed to provide a trusted GUI window that can be used to communicate between an application and a user. The trusted interaction window is a GUI window that is trusted in at least that the monitoring to detect other windows overlapping the trusted interaction window (TIW) allows the apparatus to detect attack and perhaps disable functionality, if desired, as a result. In addition, identifying information can be added to the TIW so that the TIW is easy to recognize for the user. However, even if the user cannot actually recognize the TIW, the TIW still serves a security purpose because it can be used to disable functionality sought by the attacking code. The attacker could make the user believe they had clicked a valid button in the TIW when they had not (the attacking chromeless window overlaid a different button or text), but that is another problem. To avoid the latter problem, the TIW may be combined with window personalization so that the user can in fact visually recognize the TIW. Non-visual notification, and ensuring that the window is always present (and not just shown when the user is actively using it) may also be used.

In one embodiment, the trusted interaction window application continually monitors whether or not the interaction window is partially or completely obstructed. When obstructed, the obstructing GUI elements can be disabled and a warning may be displayed or otherwise provided to the user. Other advantages will be recognized by those of ordinary skill in the art.

FIG. 1 is a diagram illustrating one example of an apparatus 100 that employs a plurality of software applications that may be, for example, stored in memory and executed by a processor. As used herein, processor includes one or more digital processing devices such as microprocessors, microcontrollers, DSPs, and also includes discrete logic, state machines, or any other suitable combination of hardware, software and firmware. Memory may include any suitable memory that stores digital data including, but not limited to for example, RAM, ROM, optical storage devices, or any other suitable storage whether local, remote or distributed. In this example, the apparatus 100 may be any suitable handheld device, other portable device, non-portable device such as a computer, or any other suitable apparatus and in this example is operatively coupled to a web server and also includes a suitable web browser application as known in the art. As shown, the apparatus 100 includes a trusted interaction window application 102 with overlay detection, a shopping application 104 such as that downloaded from a web server to facilitate online shopping, and a an executing security application 106 such as a cryptographic engine, such as a symmetric key based cryptographic engine, non-symmetric key cryptographic engine, a combination of the two, or any other suitable security engine that may perform, for example, digital signing of data, authentication of information, encryption of information, decryption of information, or any other suitable security operations. For example, a signed applet or ActiveX component run on the device may be a cryptographic engine. It is understood that the security application 106 may be a part of the trusted interaction window application 102.

Figure 2:
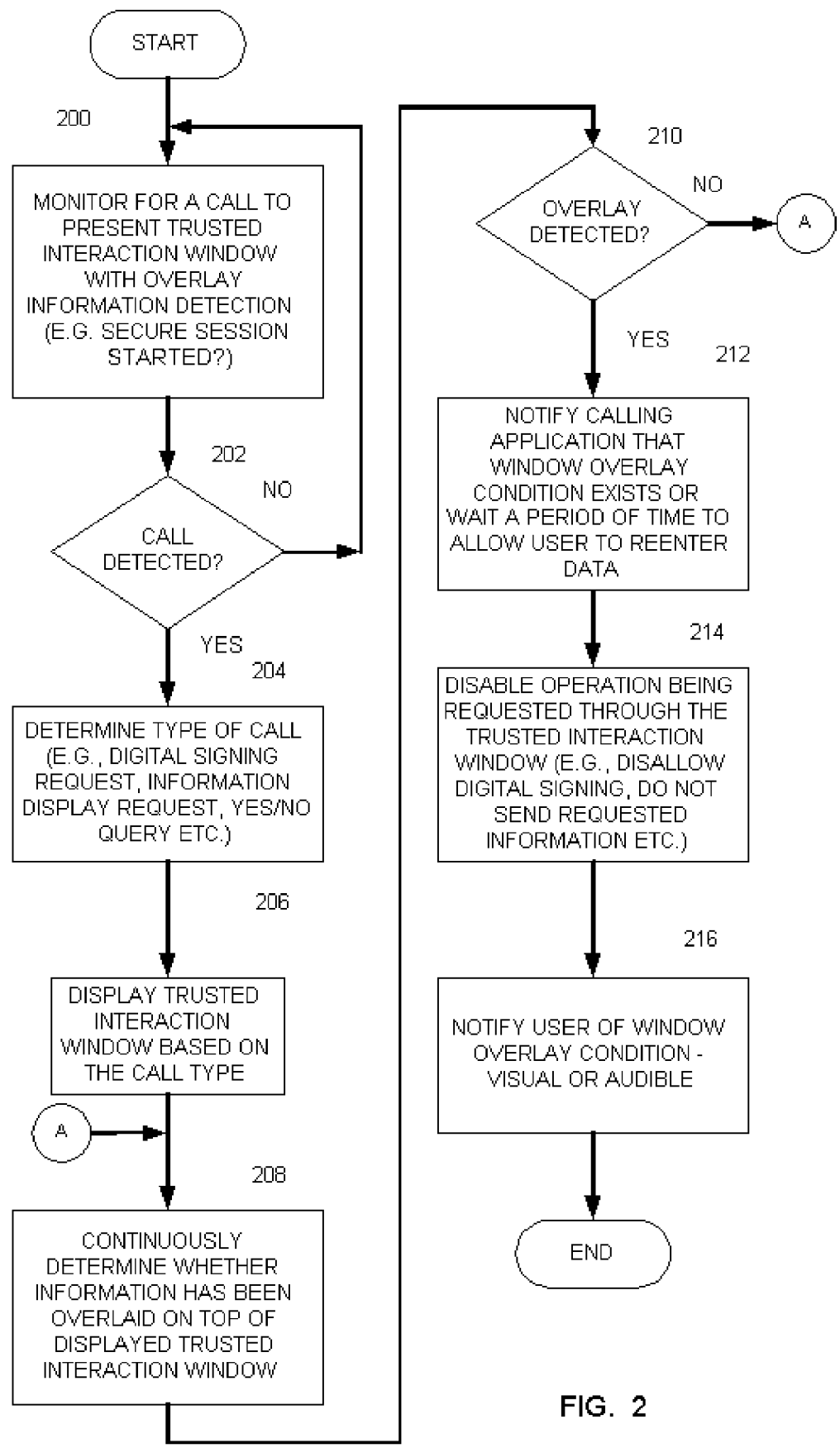
FIG. 2 is a flowchart illustrating one example of a method for protecting communication of information through a graphical user interface in accordance with one embodiment of the invention.

Referring also to FIG. 2, there is shown a flowchart illustrating one example of a method for protecting the communication of information through a graphical user interface, in accordance with one embodiment of the invention, as may be carried out for example by the apparatus 100. As shown, the trusted interaction window application 102 (e.g. the processor executing the application) generates a trusted interaction window 108 in response to a call 110 from the shopping application 104. This is shown, for example, in block 200. For example, the trusted interaction window application 102 may monitor for a call 110 to present the trusted interaction window 108 for example in response to a secure session being started, or any other suitable call information. The trusted interaction window includes any suitable trusted area on the display screen and includes an area of any suitable size or shape (e.g., rectangular, square, oval, circle or any desired shape). In addition, it will be understood that although such steps are described with reference to the trusted interaction window application 102, that any suitable application or operating system may also monitor for a call or carry out all or some of the operations described herein. As shown in block 202, if no call is detected, the trusted interaction window application 102 continues to monitor for a call. However, if a call is detected, as shown in block 204, the method includes determining the type of call required by the trusted interaction window application 102. For example, the call 110 may be for a call to digitally sign information, to prompt the user for information, or to present a graphical user interface with, for example, or for an accept and reject button shown in this example as 112 and 114 within the trusted interaction window 108. Other information may also need to be displayed in the trusted interaction window 108 depending upon the type of call, such as transaction information 116 indicative of instructions for the transaction or information entered for the transaction by the user or information provided by the shopping application 104 to be inserted into the trusted interaction window 108.

As shown in block 206, the method includes displaying the trusted interaction window based on the call type. As such, the method includes displaying a graphical user interface on a display of the apparatus 100 that includes the trusted interaction window 108.

As shown in block 208, the method includes continuously determining whether information, such as a chromeless window or any other rogue information, has been overlayed on top of at least a portion of the displayed trusted interaction window 108 after it is being displayed. For example, the entire trusted interaction window 108 may be examined or any desired portion thereof. This can allow a portion of the trusted interaction window 108 to be covered by other windows (toolbar, or other window or element) while examination of the remaining area of the trusted interaction window (or any desired portion thereof) is carried out. This may be done, for example, by the trusted interaction application 102 as later described with reference to FIG. 3. If an overlay is detected, as shown in block 210, for example if another window or a portion thereof is overlayed on top of the trusted interaction window, or any other data is overlayed thereon, the method as shown in block 212 may include notifying the calling application 104, that a trusted interaction window overlay condition exists. This may be done through response 120. In addition, response 120 may include data indicating that the transaction has been accepted or rejected if no overlay is detected. Alternatively, a suitable period of time can be allowed to lapse to allow the user to review and reenter data as the transaction information 116 through the GUI trusted interaction window 108.

As shown in block 214, the method may also include taking desired action in response to determining that a window overlay condition has occurred. One example may be disabling the operation being requested via the trusted interaction window 108 when an overlay condition has been determined. The operation may be disabled until the overlay condition has cleared. For example, if the transaction to be carried out was a digital signing of information, the method would include disabling the digital signing processing being carried out by the security application 106, such as disabling the invocation of the digital signing processing. Also for example, it may include not sending requested information back to the shopping application. Any other suitable disabling of any suitable operation may also be carried out in order to protect the user based on a detection of an overlay on top of the trusted interaction window 108. As shown in block 216, the method may also include, if desired, notifying the user of a window overlay condition by visual or audible information. As such, if a chromeless window is detected as being overlayed on top of a trusted interaction window 108, the user may be visually notified by altering the look of the trusted interaction window 108, putting a visual notice on the display, or activating an audible alarm or otherwise notifying the user of the overlay condition.

As such, the method may include generating a user notification, whether visual or audible, in response to determining that information has been overlayed on top of the displayed trusted interaction window. As another example, the method may include keeping the trusted interaction window 108 as a top most window if for example the operating system allows a given window to always be in the foreground (i.e. top most) in a display area on a display, in response to determining that an overlay condition has occurred or if not, then until the transaction is completed. For example, if a chromeless window is detected or other overlay is being attempted, the trusted interaction window 108 is maintained to be the top window until the user indicates that the transaction has been completed. In this way, only the trusted interaction window is used during the transaction as opposed to a possibly rogue application. In another example, where the TIW cannot be guaranteed to be the top most window, the TIW application disables a request (e.g., "accept" or "reject" buttons) presented by the trusted interaction window until the overlay condition is gone or disables any functionality not desired. In another embodiment, the operating system or other system component may force an attacking window that is detected as going to be overlaid on a TIW to be displayed at a different location on a display screen.

Figure 3:
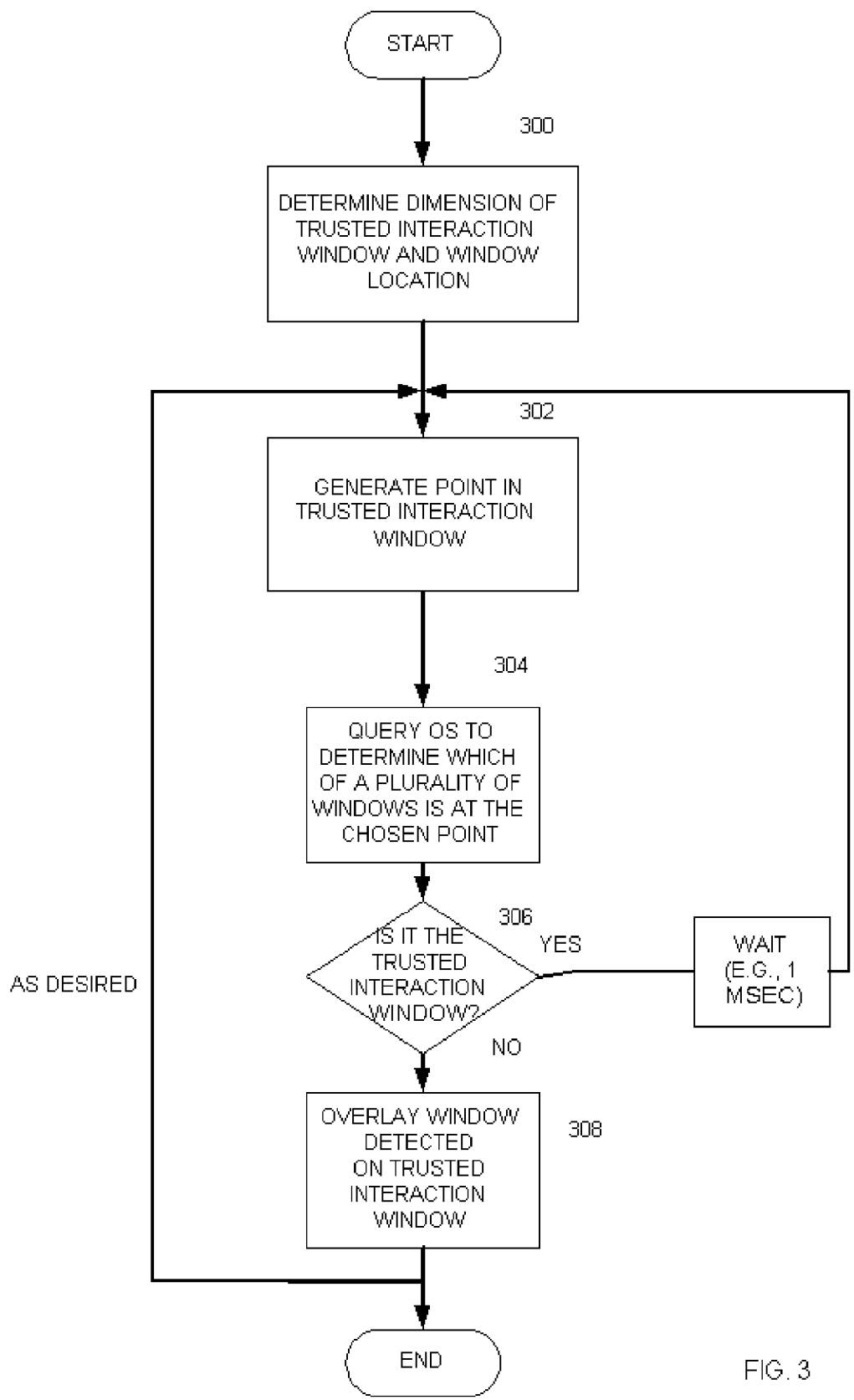
FIG. 3 is a flowchart illustrating in more detail one of the steps shown in FIG. 2.

FIG. 3 is a flowchart illustrating one example of a method for continuously determining whether information has been overlayed on top of the displayed trusted interaction window shown in block 208 of FIG. 2. As shown, the method includes determining a dimension of the trusted interaction window and its location on the display area as shown in block 300. This may be performed, for example, by a Windows based operating system, or any other suitable OS or alternatively, an application such as the trusted interaction window application 102.

As shown in block 302, the method includes generating (e.g., selecting) a point in the trusted interaction window, such as selecting a random point or any other point of interest, such as a pixel location coordinate or group of pixel locations or any other suitable area. Stated another way, the method includes selecting an area (e.g., one or more pixel locations or coordinates) within the trusted interaction window. This would also include generating a call to an operating system to identify which windows are obstructing the TIW or having the OS notify the TIW application which parts of the TIW are visible. Any other suitable mechanism may also be used. As shown in block 304, the method includes querying the operating system, for example, to determine which of a plurality of other windows is visible at the randomly chosen point, if any. As shown in block 306, the method includes as shown in block 306, determining if the window visible at the randomly chosen location is the trusted interaction window. If no overlay is detected the system may wait a period of time (e.g., 1 msec or other suitable time) before repeating the process. However, as shown in block 308, if another window, other than the trusted interaction window is detected at the selected area, then it is determined that an overlay has occurred on top of the trusted interaction window as shown, for example, in block 308 and 210.

Figure 4:
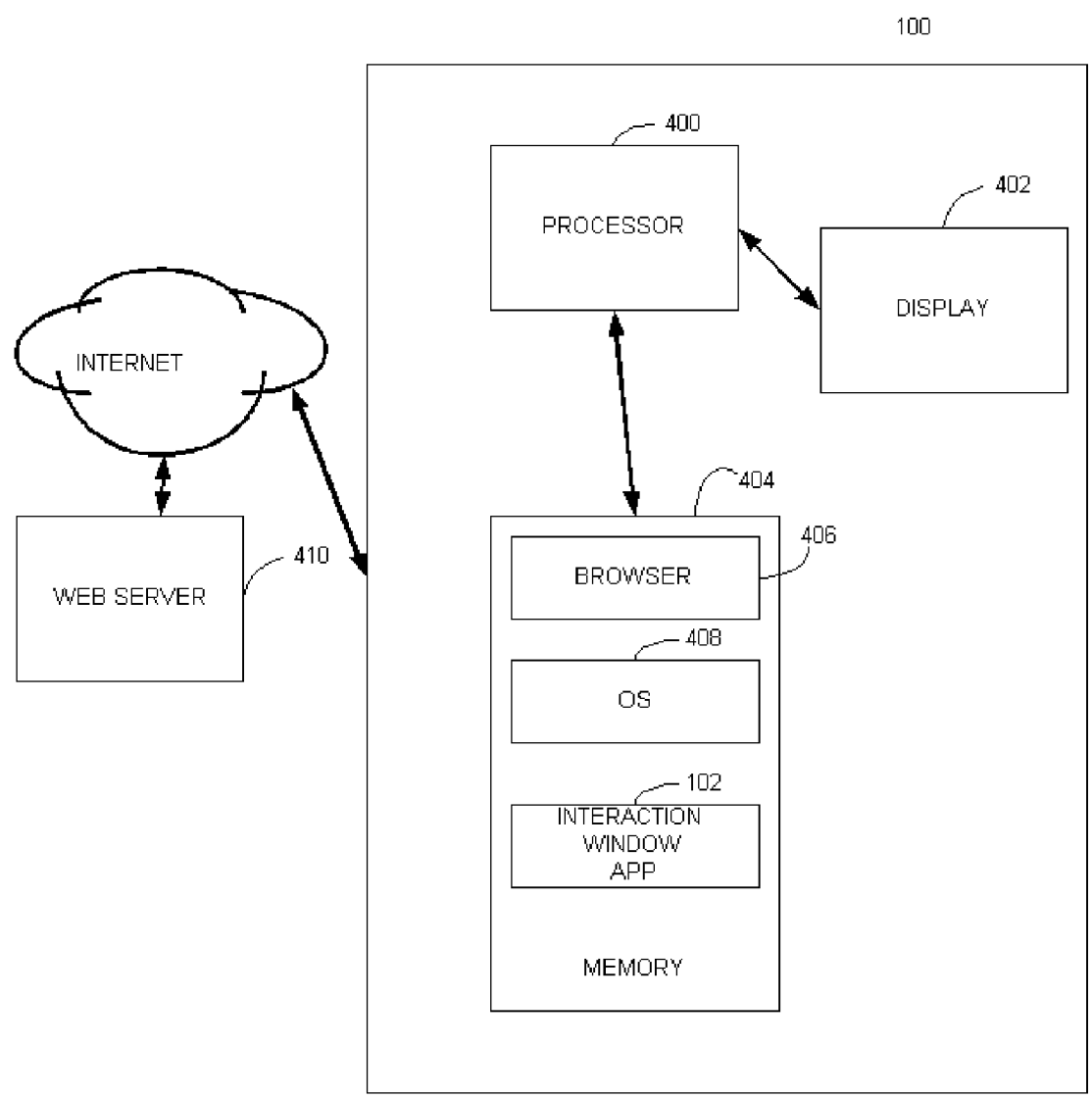
FIG. 4 is a block diagram illustrating one example of a system that employs an apparatus for protecting communication of information through a graphical user interface in accordance with one embodiment of the invention.

FIG. 4 illustrates one example of a system that includes an apparatus for protecting communication of information through a graphical user interface in accordance with one embodiment of the invention. In this example, the apparatus 100 is shown to include a processor 400, a display 402 and memory 404. As shown in this example, the memory includes executable instructions that when executed by the processor 400 causes the processor to carry out the operations as described above. In this example, a browser application 406 and operating system 408 and the interaction window application 102 are shown to be stored in the memory. Also shown is a web server 410 that may provide, for example, suitable code that is used by the browser 406 to display and provide a suitable graphical user interface to carry out transactions over the Internet or any other suitable network.

Figure 5:
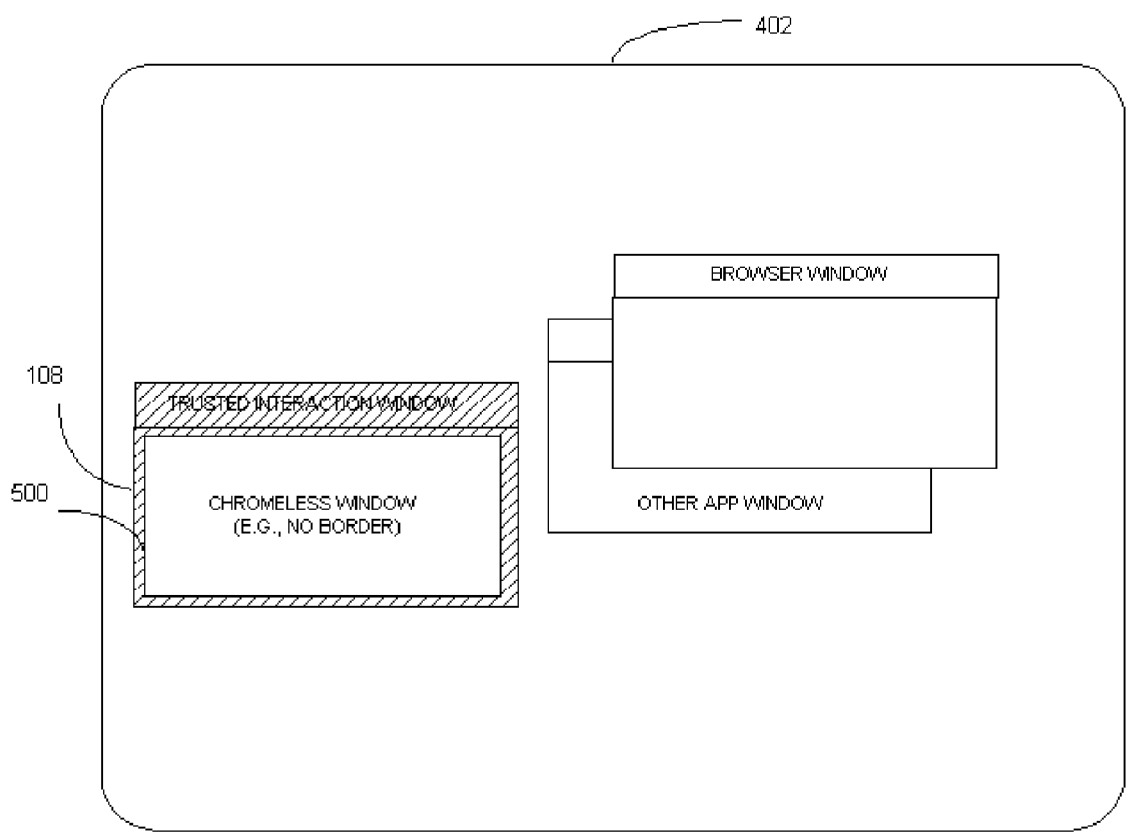
FIG. 5 is a diagram illustrating a display showing one example of a trusted interaction window in accordance with one embodiment of the invention.

FIG. 5 diagrammatically illustrates a display 402 that is displaying a trusted interaction window 108 and other non-active windows such as a browser window and another application window. The trusted interaction window 108 is shown as a top most window since it is active. It is also shown in hashed marks to visually indicate that an overlay has been detected on top of the trusted interaction window 108. In this example, a chromeless window 500 has been detected as being overlayed on top of the trusted interaction window 108. In this example, the apparatus has notified the user through a visual indication such as a change in color of the trusted interaction window notifying the user that an overlay has occurred and that the transaction cannot be completed.

Figure 6:
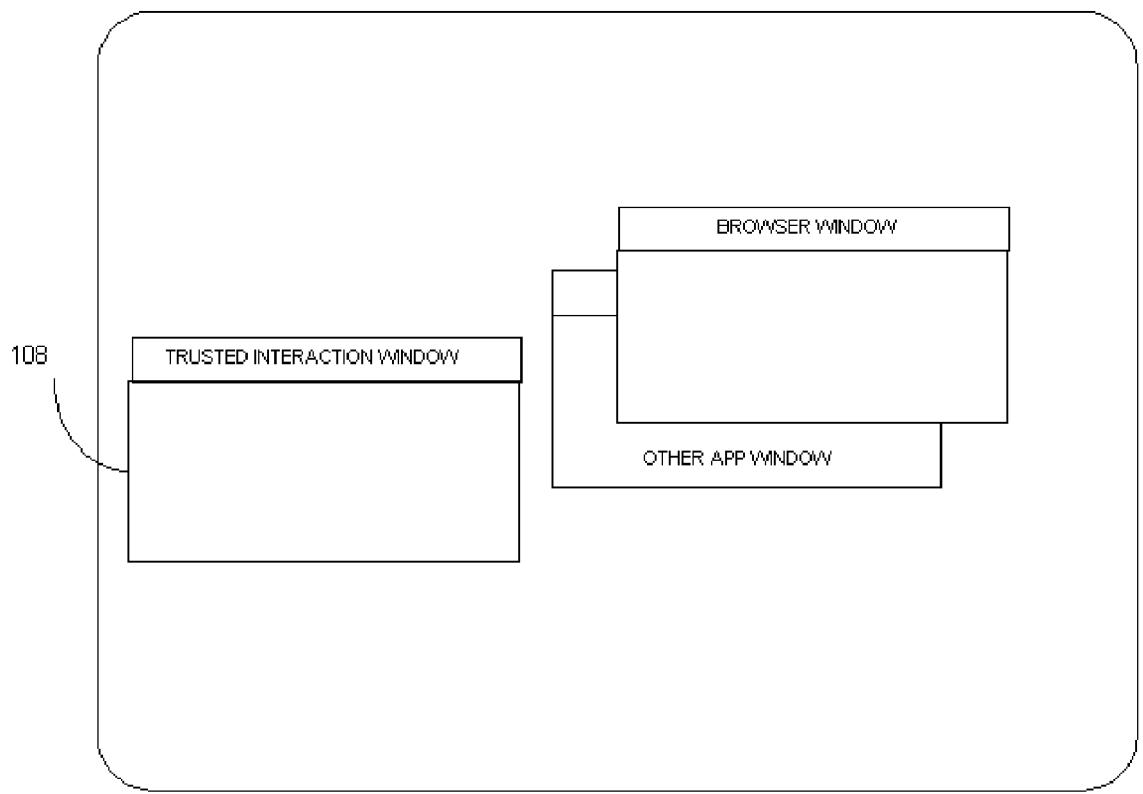
FIG. 6 is a diagram illustrating one example of a display of a trusted interaction window in accordance with another embodiment of the invention.

FIG. 6 also shows one example of the display wherein the trusted interaction window 108 is shown as being the active and top most window in accordance with one embodiment of the invention.

As such, as noted above, the trusted interaction window application may receive a call from a calling application to present the trusted interaction window 108 as part of a secure online transaction. In response to the call, the trusted interaction window application displays a trusted interaction window as part of a GUI to allow the user to either begin or complete the transaction or to otherwise interact with the user as required by the calling application.

In another embodiment, a first graphic may be selected from, for example, a stored set of graphics at installation time. The first graphic serves to defeat graphical spoofing attacks by adding an element to the display that is hard for the attacker to predict. When an action available through the trusted interaction window, is about to be taken by the user, such as the mouse pointer is over a button for example, the graphic is changed to a second graphic also chosen, for example, at random during program installation. This serves as a second level of protection from graphical spoofing attacks which also guards against an attacker who can occasionally see the screen of the target since the second graphic is not displayed continuously on the screen.

As noted above, the trusted interaction window serves as a secure window component that is an application or is part of an application or other code that displays a graphical user interface window. If not implemented within the end-user's application, the trusted interaction window application could be made available to other applications through a programmatic interface such as TCP sockets or any other suitable interface that interfaces to an end user's application. The end user's application can request, for example, that the user be asked a question and the question is displayed in the secure interaction window along with the suitable GUI elements such as buttons, for choosing an answer. Any other suitable information may also be employed in the trusted interaction window. If the trusted interaction window is partially or totally obstructed, the window may, for example, turn red until the window becomes fully visible again or any other suitable visual indication can be provided to the user.

The above detailed description of the invention and the examples described therein have been presented for the purposes of illustration and description only and not by limitation. It is therefore contemplated that the present invention cover any and all modifications, variations or equivalents that fall within the spirit and scope of the basic underlying principles disclosed above and claimed herein.

What is claimed is:

1. A method for protecting communication of information through a graphical user interface (GUI) comprising:
   receiving a call from a calling application to present an additional trusted interaction window, other than a browser window, as part of a secure on-line transaction;
   in response to the call, displaying a GUI to a user that includes the trusted interaction window as a parent window for the secure on-line transaction, wherein the trusted interaction window comprises a location for receiving transaction information to be entered for the on-line transaction;
   continuously determining, after displaying of the trusted interaction window, whether displayed information has been overlayed on top of at least a portion of the displayed trusted interaction window independent of an expiration time of access to the trusted interaction window;
   taking desired action in response to determining that displayed information has been overlayed on top of at least a portion of the displayed trusted interaction window so as to prevent a party other than the user from interfering with the on-line transaction; and
   keeping the trusted interaction window as a top most window in a display area in response to determining that displayed information has been overlayed on top of at least a portion of the displayed trusted interaction window.

2. The method of claim 1 including notifying an application of the detected overlay condition.

3. The method of claim 1 wherein continuously determining whether information has been overlayed on top of at least a portion of the displayed trusted interaction window includes:
   determining a dimension of the trusted interaction window and a location of the trusted interaction window;
   selecting an area within the trusted interaction window; and
   determining which of a plurality of windows is visible at the selected area within the trusted interaction window.

4. An apparatus comprising:
   a processor; and
   memory containing executable instructions that when executed by the processor cause the processor to:
      display a GUI to a user that includes an additional trusted interaction window, other than a browser window, independent of an expiration time of access to the trusted interaction window, for a secure on-line transaction, wherein the trusted interaction window comprises a location for receiving transaction information to be entered for the on-line transaction;
      continuously determine, after displaying of the trusted interaction window, whether displayed information has been overlayed on top of at least a portion of the displayed trusted interaction window; and
      take desired action in response to determining that displayed information has been overlayed on top of at least a portion of the displayed trusted interaction window so as to prevent another party other than the user from interfering with the on-line transaction, wherein the trusted interaction window comprises transaction information entered for an on-line transaction.

5. The apparatus of claim 4 wherein the memory includes executable instructions that cause the processor to keep the trusted interaction window as a top most window in a display area in response to determining that displayed information has been overlayed on top of at least a portion of the displayed trusted interaction window.

6. The method of claim 1 wherein displaying the GUI that includes the trusted interaction window as a parent window comprises displaying the trusted interaction window outside of a browser window.

7. The method of claim 1 wherein the displayed information is comprised of an existing and displayed overlayed window that is overlayed on the trusted interaction window.

8. A method for protecting communication of information through a graphical user interface (GUI) comprising:
   receiving a call from a calling application to present an additional trusted interaction window, other than a browser window, as part of a secure on-line transaction;
   in response to the call, displaying a GUI to a user that includes the trusted interaction window as a parent window for the secure on-line transaction, wherein the trusted interaction window comprises a location for receiving transaction information to be entered for the on-line transaction;
   continuously determining, after displaying of the trusted interaction window, whether displayed information has been overlayed on top of at least a portion of the displayed trusted interaction window independent of an expiration time of access to the trusted interaction window; and
   taking desired action, including disabling an operation being requested via the trusted interaction window and alternating the look of the trusted interaction window, in response to determining that displayed information has been overlayed on top of at least a portion of the displayed trusted interaction window so as to prevent a party other than the user from interfering with the on-line transaction.

9. A method for protecting communication of information through a graphical user interface (GUI) comprising:
   receiving a call from a calling application to present an additional trusted interaction window, other than a browser window, as part of a secure on-line transaction;

in response to the call, displaying a GUI to a user that includes the trusted interaction window as a parent window, for the secure on-line transaction, wherein the trusted interaction window comprises a location for receiving transaction information to be entered for the on-line transaction;

continuously determining, after displaying of the trusted interaction window, whether displayed information has been overlayed on top of at least a portion of the displayed trusted interaction window independent of an expiration time of access to the trusted interaction window;

taking desired action in response to determining that displayed information has been overlayed on top of at least a portion of the displayed trusted interaction window so as to prevent a party other than the user from interfering with the on-line transaction; and selecting a first graphic for display with the trusted interaction window and changing the first graphic to a second graphic in response to a detection that the user is about to take action that is available through the trusted interaction window.

10. An apparatus comprising:

a processor; and memory containing executable instructions that when executed by the processor cause the processor to:

receive a call from a calling application to present an additional trusted interaction window as part of a secure on-line transaction;

in response to the call, display a GUI to a user that includes the trusted interaction window independent of an expiration time of access to the trusted interaction window, for the secure on-line transaction, wherein the trusted interaction window comprises a location for receiving transaction information to be entered for the on-line transaction;

continuously determine, after displaying of the trusted interaction window, whether displayed information has been overlayed on top of at least a portion of the displayed trusted interaction window; and take desired action, including disabling an operation being requested via the trusted interaction window, in response to determining that displayed information has been overlayed on top of at least a portion of the displayed trusted interaction window so as to prevent a party other than the user from interfering with the on-line transaction.

11. An apparatus comprising:

a processor; and memory containing executable instructions that when executed by the processor cause the processor to:

receive a call from a calling application to present an additional trusted interaction window, other than a browser window, as part of a secure on-line transaction;

in response to the call, display a GUI to a user that includes the trusted interaction window independent of an expiration time of access to the trusted interaction window for the secure on-line transaction, wherein the trusted interaction window comprises a location for receiving transaction information to be entered for the on-line transaction;

continuously determine, after displaying of the trusted interaction window, whether displayed information has been overlayed on top of at least a portion of the displayed trusted interaction window; and take desired action in response to determining that displayed information has been overlayed on top of at least a portion of the displayed trusted interaction window so as to prevent a party other than the user from interfering with the on-line transaction;

wherein the memory includes executable instructions that cause the processor to select a first graphic for display with the trusted interaction window and change the first graphic in response to a detection that the user is about to take action.

12. The method of claim 1 including, in response to detecting that displayed information has been overlayed on top of at least a portion of the displayed trusted interaction window, alternating the look of the trusted interaction window.

13. The method of claim 1 including, in response to detecting that displayed information has been overlayed on top of at least a portion of the displayed trusted interaction window, generating an audible notification that displayed information has been overlayed on top of the at least a portion of the trusted interaction window.

* * * * *